United States Patent [19]

Nemoto et al.

[11] 4,176,804

[45] Dec. 4, 1979

[54] REEL FOR TAPE

[75] Inventors: Tsuneo Nemoto, Sendai; Kiichiro Toyoshima, Izumi, both of Japan

[73] Assignee: Sony Corporation, Tokyo, Japan

[21] Appl. No.: 905,893

[22] Filed: May 15, 1978

[30] Foreign Application Priority Data

May 20, 1977 [JP] Japan ............................. 52-65674[U]

[51] Int. Cl.² .......................................... B65H 75/22
[52] U.S. Cl. .................................. 242/68.5; 242/71.8
[58] Field of Search .................. 242/71.8, 68.5, 68.6, 242/115, 116, 118.3, 118.31, 118.32, 118.4, 118.6, 118.8

[56] References Cited

U.S. PATENT DOCUMENTS 3,044,728  7/1962  Landgraf et al. .................... 242/68.5

FOREIGN PATENT DOCUMENTS

2441386  3/1975  Fed. Rep. of Germany .......... 242/71.8

Primary Examiner—Harvey C. Hornsby
Assistant Examiner—John M. Jillions
Attorney, Agent, or Firm—Lewis H. Eslinger; Alvin Sinderbrand

[57] ABSTRACT

A reel includes a pair of segments which are demountable from each other and one of which is moulded integrally with a flange, while the other segment includes a segmental inner member and a segmental outer member which are connected by a pair of connecting members at their ends. The outer member is prevented from deforming polygonally by providing a sectorial space between the inner member and the outer member, with a clearance between the inner member or the outer member and the adjacent rib which extends almost across the sectorial space.

9 Claims, 17 Drawing Figures

REEL FOR TAPE

BACKGROUND OF THE INVENTION

1. Field of the Invention

This invention relates generally to a reel for tape, and more particularly, is directed to a reel on which a magnetic tape is wound for use in a magnetic recording and/or reproducing apparatus.

2. Description of the Prior Art

Figure 1:
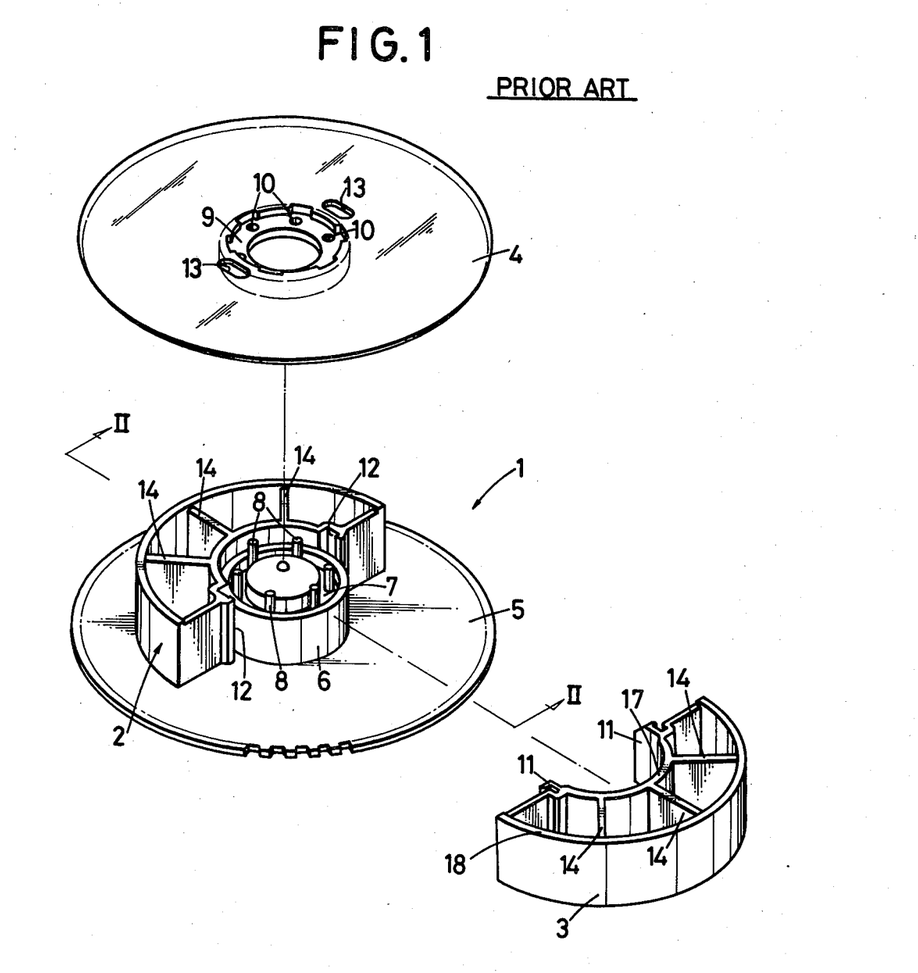
FIG. 1 is an exploded perspective view of a conventional tape reel for use in a cassette-type VTR.

A tape cassette for a cassette type V.T.R. (Video Tape Recorder) contains a pair of reels. FIG. 1 shows an existing reel which comprises a pair of segmental reel hubs 2 and 3 and a pair of upper and lower flanges 4 and 5. The segment 2, having an angular extent if 180° and, the segment 3 also having an angular extent of 180° form one circular reel hub. The segment 2 and the lower flange 5 are moulded integrally of synthetic resin. Further, a boss 6 is formed integrally with the lower flange 5. A circular recess 7 is defined in the top of the boss 6. Six pins 8 are projected from the recess 7. On the other hand, a projected portion 9 is formed at the center of the upper flange 4. The projected portion 9 is projected downward and is fitted in the recess 7. When the projected portion 9 is received in the recess 7, the six pins 8 extend through respective small holes 10 which are formed in the projected portion 9. And then the top ends of the pins 8 are deformed thermally, whereby the upper flange 4 is connected with the boss 6 formed on the lower flange 5.

Figure 2:
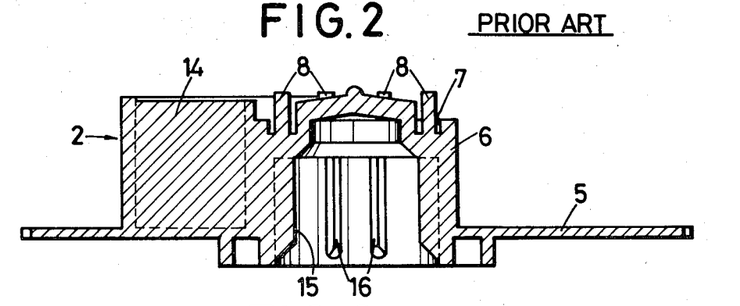
FIG. 2 is a sectional view taking along the line II—II in FIG. 1.

As shown in FIG. 2, the boss 6 is hollow to provide a socket 15 to receive a reel drive shaft (not shown). Oblong projections 16 are formed axially on the surface of socket 15 and the projections 16 engage with grooves formed on the peripheral surface of the reel drive shaft. Thereby, the reel 1 is driven by the reel drive shaft which is provided on the V.T.R. apparatus.

The segment 3, which is separated from the flanges 4 and 5, provides a pair of detents 11, and corresponding to these detents 11, a pair of engaging portions 12 are formed on the segment 2. Therefore, the detents 11 engage with the engaging portions 12 to connect the segment 2 and segment 3 to each other. Further, one end of a magnetic tape, which is wound on the reel 1, is pinched between one of the detent 11 and the respective engaging portion 12 and is affixed to the reel 1. A pair of oblong openings 13 are formed on the upper flange 4 so that a screw-driver or other tool may be inserted therethrough to disengage the detents 11 from the engaging portions 12.

Figure 3:
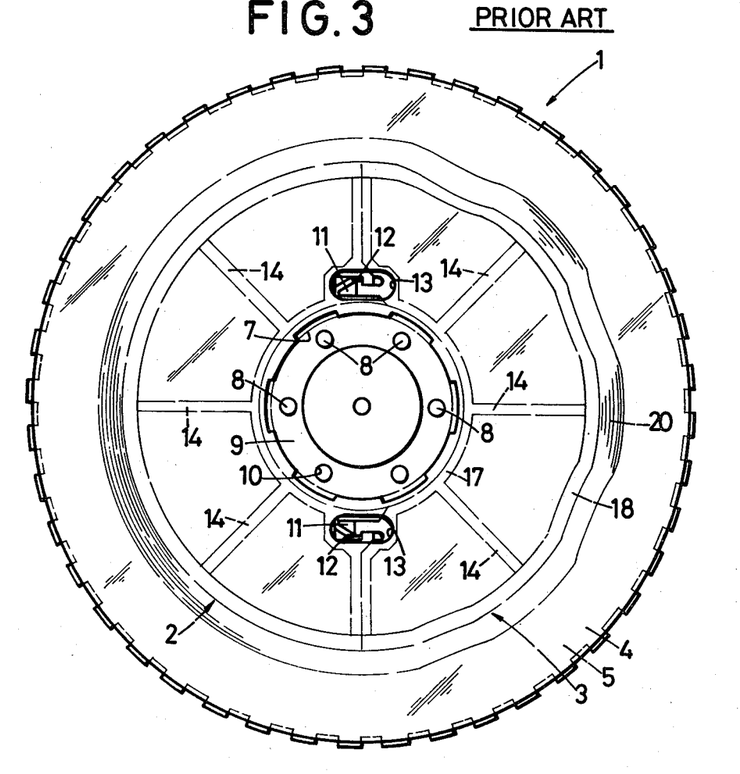
FIG. 3 is a plan view of the reel of FIGS. 1 and 2.

When a magnetic tape 20 is wound on the peripheral surface of the reel 1, as shown in FIG. 3, tape 20 exercises inward forces in the radial direction against the segments 2 and 3 owing to the tension of the magnetic tape 20. The segment 2 receives the force not only with ribs 14, but also with the lower flange 5 which is formed integrally with the segment 2. Accordingly, the outer surface of segment 2 is not deformed even at the intermediate portion between the ribs 14.

However the segment 3 receives the inner force only with the ribs 14, because the segment 3 is separately moulded from the flanges 4 and 5. Accordingly, the outer surface of segment 3 deforms at the intermediate portions between the ribs 14, and the segment 3 becomes polygonal as shown in FIG. 3. Accordingly, the magnetic tape 20 is stretched intermittently in the direction of the tape length. Thus, the irregularly, tensioned tape causes tracking errors when the video signals are reproduced from the tape by the V.T.R. apparatus. The shrinking of the tape 20 owing to the decrease of the temperature also causes the deformation of the segment 3 as shown in FIG. 3, and adversely affects the magnetic tape 20.

OBJECTS AND SUMMARY OF THE INVENTION

One of the objects of this invention is to provide an improved reel which is not deformed polygonally by tension of the tape wound on the reel.

In accordance with an aspect of this invention a reel comprises first and second segmental reel hubs and first and second flanges, with the first segmental reel hub being moulded integrally with at least the first one flanges of synthetic resin. A boss is formed on the first flange and the second flange is connected with the boss, for example through thermal welding. The second segmental hub is demountably connected with the first segment through engaging means.

The second segmental hub includes a segmental inner member and a segmental outer member, and these members are connected by a pair of connecting members at both their ends considered in the circular direction of the reel hub. Further, a sectorial space is formed between the inner member and the outer member. Thereby, polygonal deformation of the reel is prevented. Alternatively, the second segmental hub further includes a rib or ribs, extending almost across the sectorial space but being separated from the inner member or the outer member with a clearance therebetween. This structure also prevents the reel from polygonal deformation.

The above, and other objects, features and advantages of this invention will be apparent from the following detailed description of illustrative embodiments thereof which is to read in accordance with the accompanying drawings.

DETAILED DESCRIPTION OF THE PREFERRED EMBODIMENTS

Referring to the drawings in detail, it will be seen that the various embodiments of the invention there illustrated relate to a tape reel for a tape cassette intended for use in a VTR, and that the parts thereof which correspond to the parts already described with reference to FIGS. 1-3 are denoted by the same reference numerals, and the description thereof will be omitted.

Figure 4:
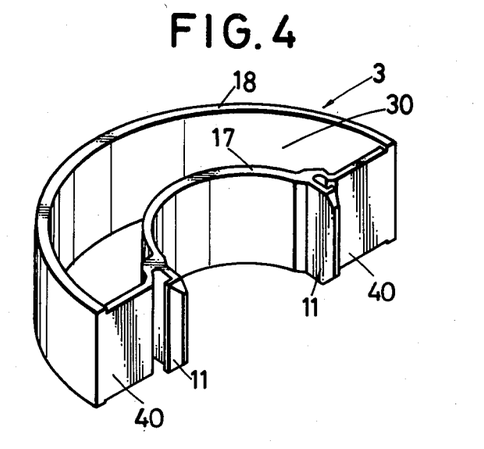
FIG. 4 is a perspective view of a segment of a tape reel according to a first embodiment of this invention.

The conventional segment 3 is shown on FIG. 1 to have three ribs 14 extending between the segmental inner member 17 and the segmental outer member 18, in additional to the connecting members which connect the members 17 and 18 at both the ends considered in the circular direction. However, in the embodiment of the invention shown on FIGS. 4-6, the segment 3 has no rib. Connecting members 40 connect the segmental inner member 17 and the segmental outer member 18 at both their ends in the circular direction. Therefore, a sectorial space 30 is formed between the members 17 and 18. According to this arrangement, no part of the segment 3 receives exclusively the inward force in the radial direction, and the member 18 of the segment 3 retains its semi-circular shape so far as the member 18 is not buckled. Further, the magnetic tape 20 does not exert so large force on the member 18 that the member 18 is buckled. Therefore, the outer member 18 is not subjected to polygonal deformation, and the magnetic tape 20 is prevented from intermittently stretching in the direction of tape length.

Figure 5:
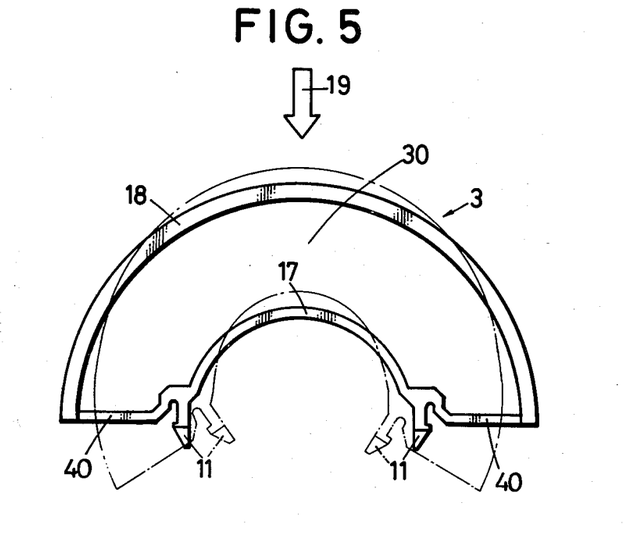
FIG. 5 is a plan view of the segment of FIG. 4.
Figure 6:
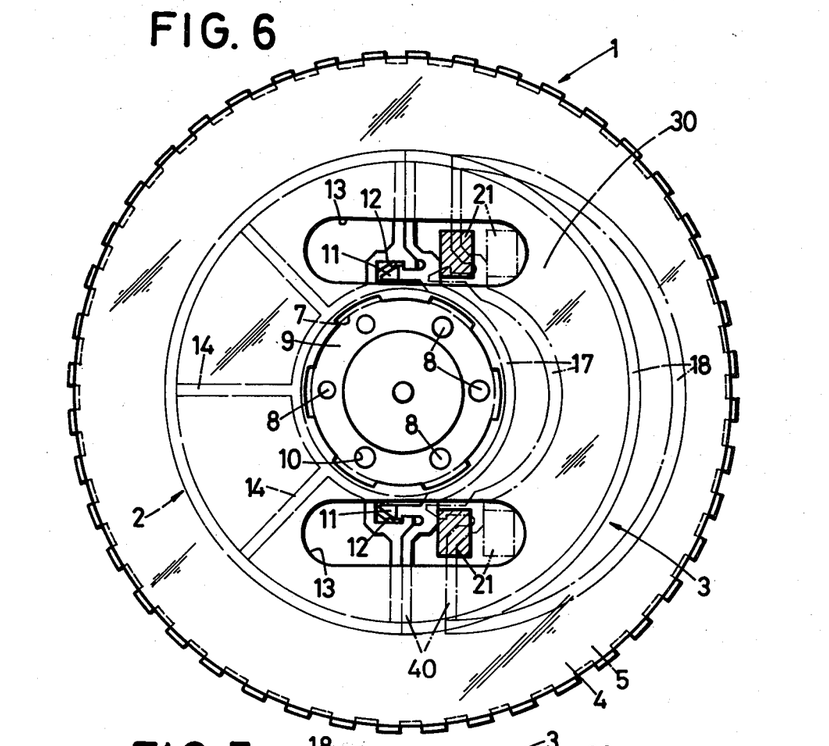
FIG. 6 is a plan view of the reel according to the first embodiment, and which shows how the segments are connected with each other.

However, with this arrangement, the segment 3 deforms as shown in dot-dash line in FIG. 5 because no member a force between the members 17 and 18, when the segment 3 is pushed by the force represented by the arrow 19 to connect the segment 3 with the segment 2. Then, it is very difficult to engage the detents 11 with the engaging portions 12. Therefore, a pair of large oblong openings 13 are formed in the upper flange 4 of the reel 1 of this embodiment to permit a pair of pushing members 21 to be inserted through the openings 13 for acting against the connecting members 40 and thereby urging the detents 11 into engagement with the engaging portions 12 as shown in FIG. 6. Alternatively, a pair of oblong openings may be formed in the lower flange 5 to penetrate the pushing members 21 through the reel 1 in axial direction.

Figure 7:
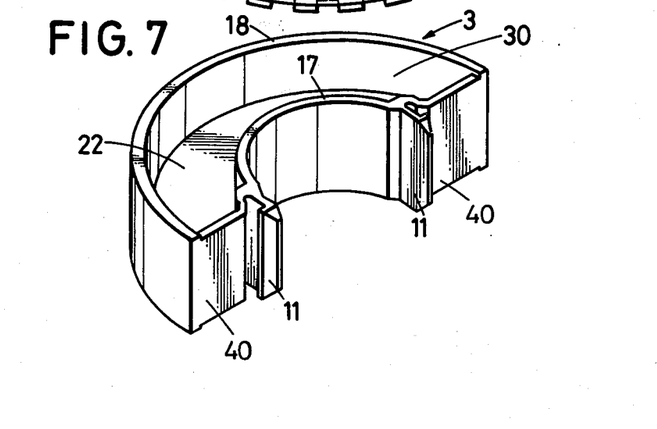
FIG. 7 is a perspective view of a segment of a tape reel according to a second embodiment of the invention.

In the above described first embodiment, the segment 3 is connected with the segment 2 through the use of the pushing members 21 because the segment 3 has no rib which extends across the sectrial space 30. However, in the embodiment of FIGS. 7-9, the segment 3 has a segmental rib 22 which extends almost across the sectorial space 30 in the lateral direction. The segmental rib 22 is connected with the inner member 17, and the outer edge of the rib 22 is separated from the outer member 18, thereby a clearance 23 (FIG. 8) is formed between the outer member 18 and the outer edge of the rib 22.

Figure 8:
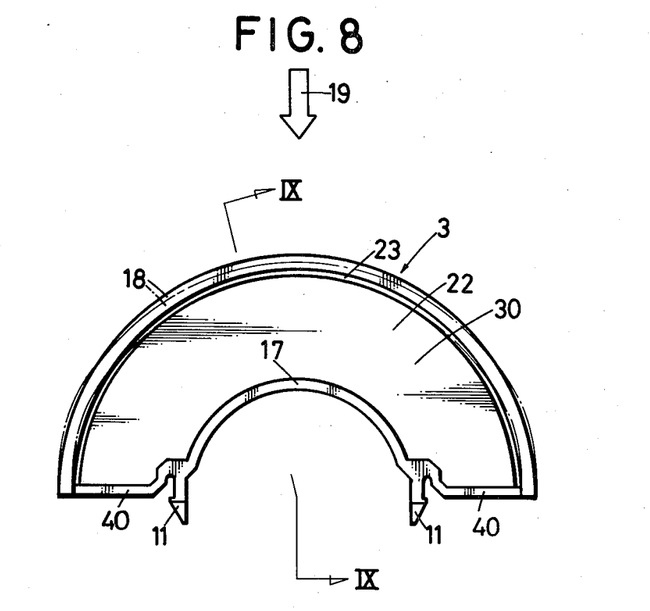
FIG. 8 is a plan view of the segment of FIG. 7.
Figure 9:
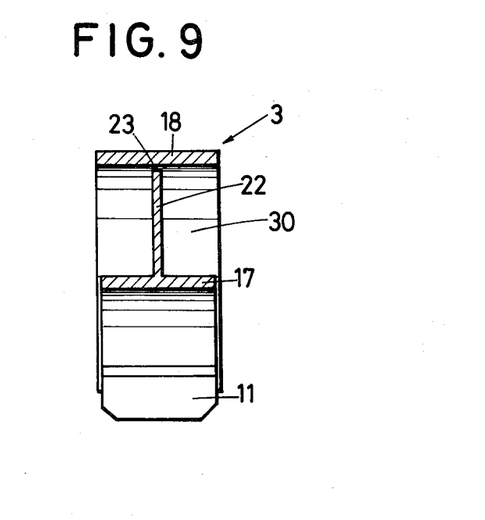
FIG. 9 is a sectional view taking along the line IX-IX in FIG. 8.

According to this arrangement, the outer member 18 is deformed by the force represented by the arrow 19 in FIG. 8 and the inner surface of the member 18 contacts with the outer edge of the rib 22, as shown by the dot-dash line in FIG. 8. The force is transmitted to the inner member 17 through the rib 22, and the detents 11 are engaged with the engaging portions 12 to connect the segment 2 and segment 3 to each other.

According to this embodiment, the pushing members 21 are unnecessary. Further, the magnetic tape 20 is prevented from intermittently stretching by the clearance 23 formed between the outer member 18 and the rib 22.

Figure 10:
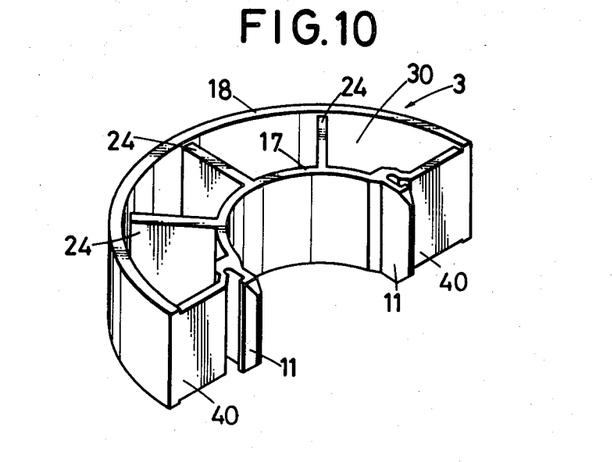
FIG. 10 is a perspective view of a segment of a tape reel according to a third embodiment of the invention.
Figure 11:
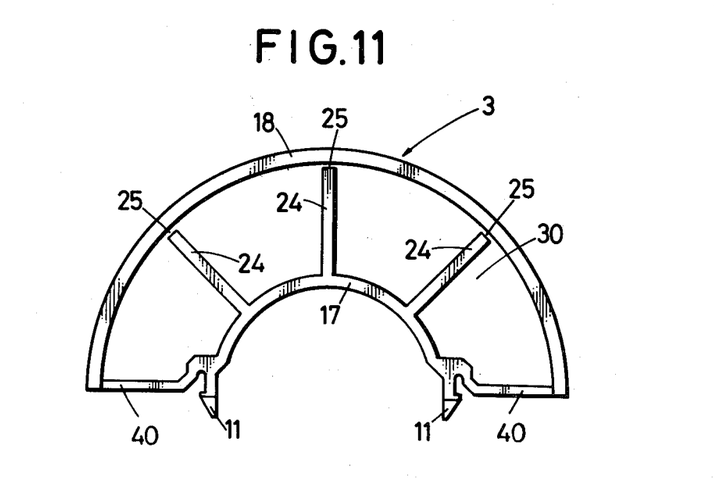
FIG. 11 is a plan view of the segment of FIG. 10.

Next, the third embodiment of this invention will be described with reference to FIG. 10 and FIG. 11. In the above mentioned embodiment of FIGS. 7-9, the segment 2 and segment 3 can be connected with each other without using pushing members. But, it is very difficult to deform the inner segmental member 17 because the segmental rib 22 is connected to the member 17. Therefore, the connecting of the detents 11 and the engaging portions 12 is made possible only by the elastical deformation of the detents 11. As distinguished from the foregoing, in the embodiment of FIGS. 10 and 11, the segment 3 has three ribs 24 which extends almost across the sectorial space 30 in the radial direction. The ribs 24 are connected with the inner member 17, and the outer edges of the ribs 24 are separated from the outer member 18 to form clearances 25.

By this arrangement, the segment 2 and segment 3 can be connected with each other without requiring the use of pushing members 21. Further, as the inner member 17 is also deformable, the segment 3 is connected with the segment 2 by the engagement of the detents 11 and the engaging portions 12 owing to the deformation of the whole of segment 3. Further, the reel 1 is prevented from polygonal deformation by the clearances 25 between the outer edges of the ribs 24 and the outer member 18.

Figure 12:
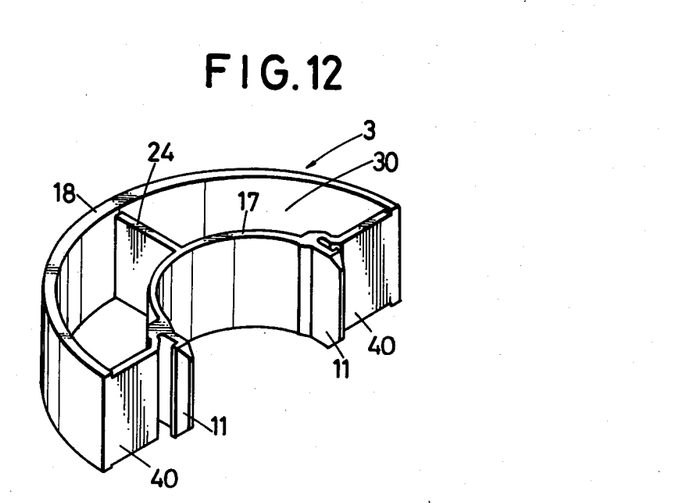
FIG. 12 is a perspective view of a segment of a tape reel according to a fourth embodiment of the invention.
Figure 13:
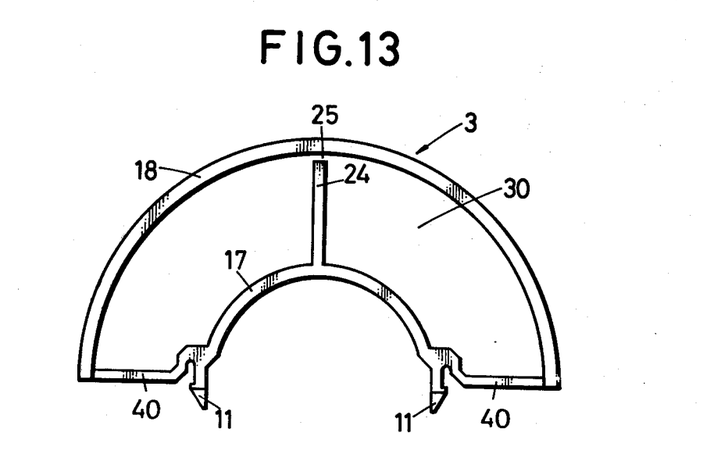
FIG. 13 is a plan view of the segment of FIG. 12.

The fourth embodiment of this invention will now be described with reference to FIGS. 12 and 13. In the above mentioned third embodiment, the force for connecting the segment 3 with the segment 2 is primarily transmitted by the central one of the ribs 24 rather than the other two ribs 24. That is, the central rib 24 extends across the space 30 in the direction to transmit the force, while the other ribs 24 are angled relative to the direction of the force. Accordingly, in the embodiment of FIGS. 12 and 13, a single central rib 24 is provided across the space 30, and the outer edge of the rib 24 is separated from the member 18 to form a clearance 25. By the arrangement of FIGS. 12 and 13, substantially the same effects are obtained as with the embodiment of FIGS. 10 and 11.

Figure 14:
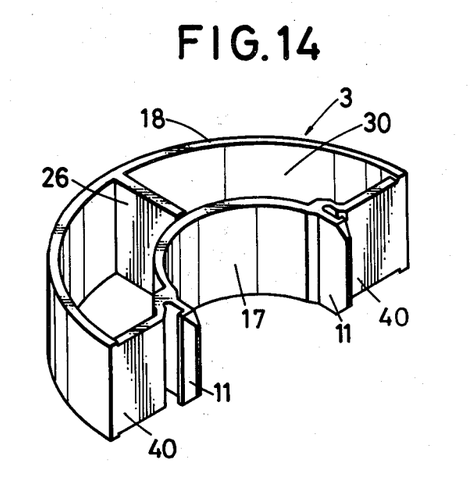
FIG. 14 is a perspective view of a segment of a tape reel according to a fifth embodiment of the invention.
Figure 15:
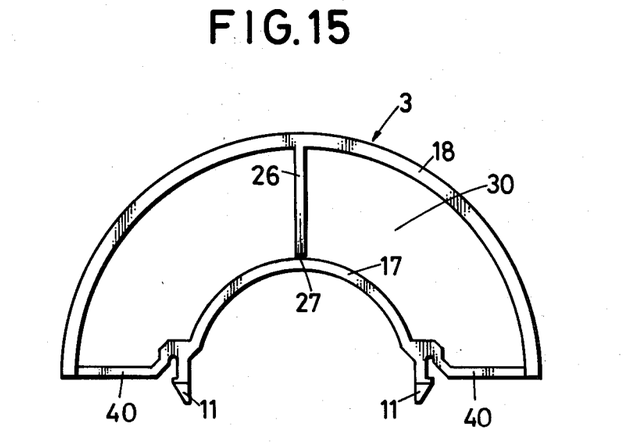
FIG. 15 is a plan view of the segment of FIG. 14.

Next, will be described the fifth embodiment of this invention with reference to FIG. 14 and FIG. 15. In the embodiment of FIGS. 12 and 13, the central rib 24 is connected with the inner member 17 and a clearance is formed between the outer edge the rib 24 and the outer member 18. Alternatively, as shown in FIGS. 14 and 15, a rib 26 is connected with the outer member 18, and a clearance 27 is formed between the end of the inner edge or rib 26 and the inner member 17. By this arrangement, substantially the same effect is obtained as with the embodiment of FIGS. 12 and 13.

Figure 16:
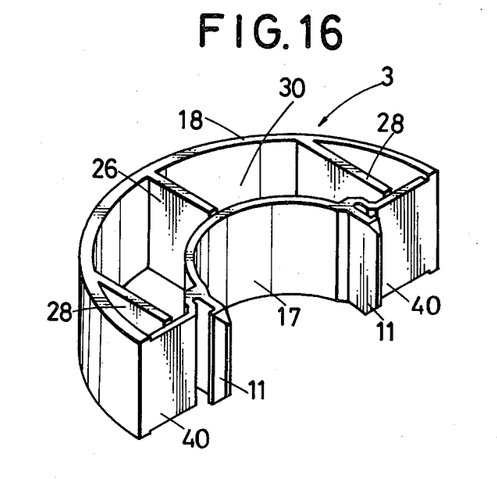
FIG. 16 is a perspective view of a segment of a tape reel according to a sixth embodiment of the invention.
Figure 17:
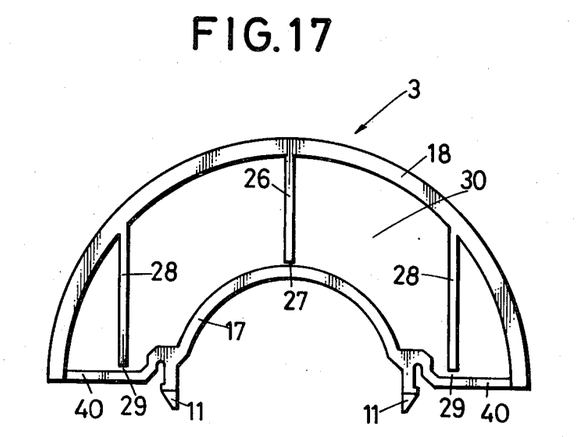
FIG. 17 is a plan view of the segment of FIG. 16.

Next, will be described the sixth embodiment of this invention with reference to FIG. 16 and FIG. 17. In this embodiment two, additional ribs 28 are provided at the opposite sides of the central rib 26 described with reference to FIGS. 14 and 15. These ribs 28 are arranged symmetrically relative to the central rib 26 and are parallel with the central rib 26. That is, the ribs 28 extend in the direction that the force has to be transmitted to connect the segment 3 with the segment 2. These ribs 28 are connected to the outer member 18, and clearances 29 are formed between the inner ends of the ribs 28 and the inner member 17. By this arrangement, substantially the same effect is obtained as with the embodiment of FIGS. 14 and 15. Furthermore, the force is transmitted through not only the rib 26 but also the ribs 28, when the segments 2 and 3 are connected to each other. Thereby, the connecting operation becomes very easy.

While this invention has been described with reference to specific illustrative embodiments, it will be recognized by those skilled in the art that modifications may be made therein without departing from the true scope of the invention as defined by the following claims.

For instance, this invention may be applied to a reel which comprises a pair of segmental reel hubs both formed separately from the upper flange and the lower flange.

What is claimed is:

1. A reel for tape comprising first and second segmental reel hubs which are demountable from each other; at least said first segmental reel hub including segmental inner and outer members, connecting members connecting together said segmental inner and outer members at their ends, considered in the circular direction, so that a sectorial space is defined between said segmental inner and outer members, and at least one rib joined to, and extending from one of said segmental inner and outer members substantially across said sectorial space to adjacent the other of said inner and outer members with a clearance being defined between said other member and an adjacent edge of said rib.

2. A reel for tape according to claim 1; in which said rib is segmental in shape and extends laterally in a plane normal to an axis of the reel.

3. A reel for tape according to claim 2; in which said rib is joined to said inner member and has a semi-circular outer edge which, with said outer member, defines said clearance therebetween.

4. A reel for tape according to claim 1; in which said rib extends radially in a direction in which a force has to be transmitted for connecting said segmental reel hubs to each other.

5. A reel for tape according to claim 4; in which said first segmental reel hub further includes additional ribs symmetrically disposed in respect to said one rib and being also joined to, and extending from said one member substantially across said sectorial space to adjacent said other member with clearances defined between said other member and the adjacent edges of said additional ribs.

6. A reel for tape according to claim 5; in which said additional ribs also extend radially at angles to the first mentioned rib.

7. A reel for tape according to claim 5; in which said additional ribs extend parallel to the first mentioned rib.

8. A reel for tape according to claim 1; in which each said rib is joined to said inner member and has an outer edge spaced from said outer member to define said clearance therebetween.

9. A reel for tape according to claim 1; in which each said rib is joined to said outer member and has an inner edge spaced from said inner member to define said clearance therebetween.

* * * * *